United States Patent [19]
Byrne

[11] Patent Number: 5,591,916
[45] Date of Patent: Jan. 7, 1997

[54] FOREIGN OBJECT DETECTOR FOR VEHICLES AND OTHER MACHINERY

[76] Inventor: Frederick N. Byrne, 63 Grove Road, The Spa, Ballynahinch, Down, BT24 8HQ, United Kingdom

[21] Appl. No.: 284,576
[22] PCT Filed: Feb. 10, 1993
[86] PCT No.: PCT/GB93/00277
  § 371 Date: Oct. 3, 1994
  § 102(e) Date: Oct. 3, 1994
[87] PCT Pub. No.: WO93/16400
  PCT Pub. Date: Aug. 19, 1993

[30] Foreign Application Priority Data

Feb. 10, 1992 [GB] United Kingdom .................. 9202714

[51] Int. Cl.⁶ .......................... G01N 29/04; G08B 21/00
[52] U.S. Cl. .......................... 73/649; 73/579; 340/425.5; 340/438
[58] Field of Search ...................... 73/649, 19.03, 73/24.03, 24.04, 54.41, 61.45, 61.49, 61.75, 61.79, 579, 580, 598, 600, 582; 340/582, 425.5, 438, 429, 945, 568

[56] References Cited

U.S. PATENT DOCUMENTS

| | | | |
|---|---|---|---|
| 4,553,137 | 11/1985 | Marxer et al. | 340/582 |
| 4,607,520 | 8/1986 | Dam | 73/19.03 |
| 4,685,326 | 8/1987 | Peterson | 73/580 |
| 4,941,356 | 7/1990 | Pallaske | 73/587 |
| 5,144,838 | 9/1992 | Tsuboi | 73/579 |
| 5,404,128 | 4/1995 | Ogino et al. | 340/425.5 |

FOREIGN PATENT DOCUMENTS

| | | |
|---|---|---|
| 3443401 | 5/1986 | Germany . |
| 2070833 | 9/1981 | United Kingdom . |

OTHER PUBLICATIONS

Patent Abstracts of Japan vol. 8, No. 113 (P–276) (1550) 26 May 1984 & JP,A,59 20 819 (Hitachi Seisakusho KK).

*Primary Examiner*—Hezron E. Williams
*Assistant Examiner*—Helen C. Kwok
*Attorney, Agent, or Firm*—Flynn, Thiel, Boutell & Tanis, P.C.

[57] ABSTRACT

The panel is set in vibration by an excitor (22) and changes in the pattern of vibration due to the loading or damping of the panel by an attached device are detected. The input from piezoelectric detectors is passed by amplifier (12) and analog-to-digital converter (13) to a microprocessor (14). Under control of programs held by EPROM (16) the inputs from successive test cycles are analyzed and compared to determine whether a significant change in the condition of the panel has recurred, in which case an alarm is given by an indicator (25).

16 Claims, 3 Drawing Sheets

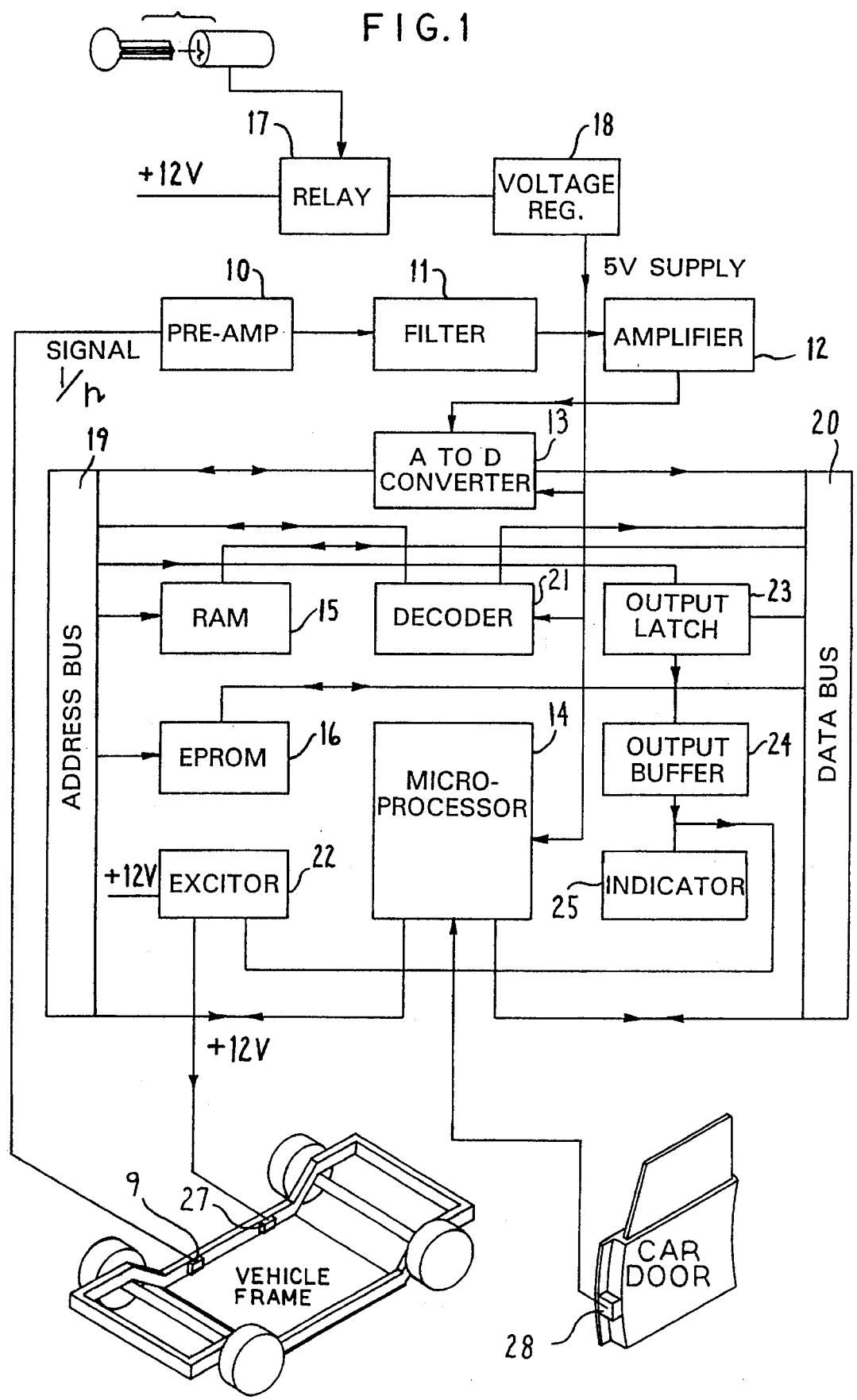

FOREIGN OBJECT DETECTOR FOR VEHICLES AND OTHER MACHINERY

FIELD OF THE INVENTION

The present invention concerns equipment for detecting a device, such as a car bomb, attached to a panel of a vehicle or the like.

BACKGROUND OF THE INVENTION

Car bombs are the most efficient way which terrorists have devised to kill or maim their victims. It is a method which is used frequently in Northern Ireland. Except on relatively rare occasions these devices have been attached to the vehicle by quite powerful permanent magnets. Several systems relying on the detection of the magnetic fields emitted by the magnets have been devised to detect these bombs. Clearly, these systems can only detect those devices which have been attached magnetically and are thus extremely limited in scope.

SUMMARY OF THE INVENTION

The present invention seeks to overcome the disadvantages of current detecting systems. This invention senses the change in the mechanical properties of the car panel to which the bomb is attached. It does not depend on the magnetic properties of the explosive device.

In accordance with the invention there is provided equipment for detecting the attachment of a device to a panel of a vehicle or the like, comprising means for exciting vibrations in the panel, means for detecting the vibrations, control and analysis means for controlling the exciting and detecting means, for recording a normal vibration pattern, and for detecting departures from that pattern resulting from the attachment of a device, and an alarm triggered by the control and analysis means when the presence of a device is detected.

When a membrane such as a metal plate is caused to vibrate certain frequencies will predominate. The amplitude and frequency of the displacements depend on the tension in, and the mass per unit area of the membrane.

If an extra mass is attached to the membrane both these quantities will change. If, on the other hand, an external force is applied to the membrane, caused perhaps by an object being pressed against it, the tension in the membrane will change, also the vibrations will be differently damped. The vibrational pattern will be altered as a result.

The invention utilises these principles by considering the floor pan of the vehicle as a membrane under tension. The floor-pan is forced into vibration. The pattern of vibrations is detected, analyzed and stored in microprocessor memory. This process is repeated at certain predetermined intervals and the vibration patterns correlated with one another. A sudden change in this correlation indicates a change in the mass, the tension, or vibrational damping of the vehicle's floor-pan. This is interpreted and a warning given if suitable criteria are met.

BRIEF DESCRIPTION OF THE DRAWING

An embodiment of the invention will now be described, by way of example, with reference to the accompanying drawings, in which FIG. 1 is a block diagram of the electronic circuitry of a car-bomb detector.

DETAILED DESCRIPTION

Figure 1A:
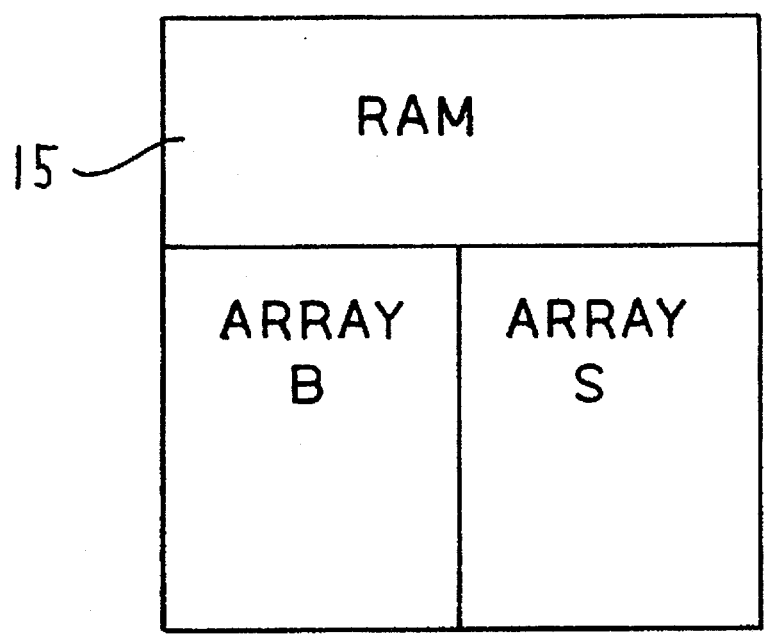
FIG. 1A is a block diagram of the partial contents of the random access memory of this invention and FIG. 2 is a flow chart of the operations performed by the circuitry.

The structure of the vehicle can be set into vibration either mechanically or by piezo-electric crystals 27. A set of receiving piezo-electric crystals detect the resulting frequency pattern. This signal is amplified by a variable gain amplifier and filtered to remove unwanted frequencies. It is then routed to an analogue to digital converter and thence to a microprocessor and other digital hardware as shown in the block diagram of FIG. 1.

The block diagram shows the equipment for one channel with a single piezo-electric detector 9 which is connected by way of pre-amplifier 10, filter 11, amplifier 12, and analog to digital converter 13 to the digital electronic circutry. Normally a separate detector 9 is required for each panel and has its own amplifiers 10, 12 and filters 11. The analog to digital converter 13 and the remainder of the circuit, in particular a micro-processor 14, RAM 15, EPROM 16 and associated digital integrated circuits, are common to all the channels.

Figure 2:
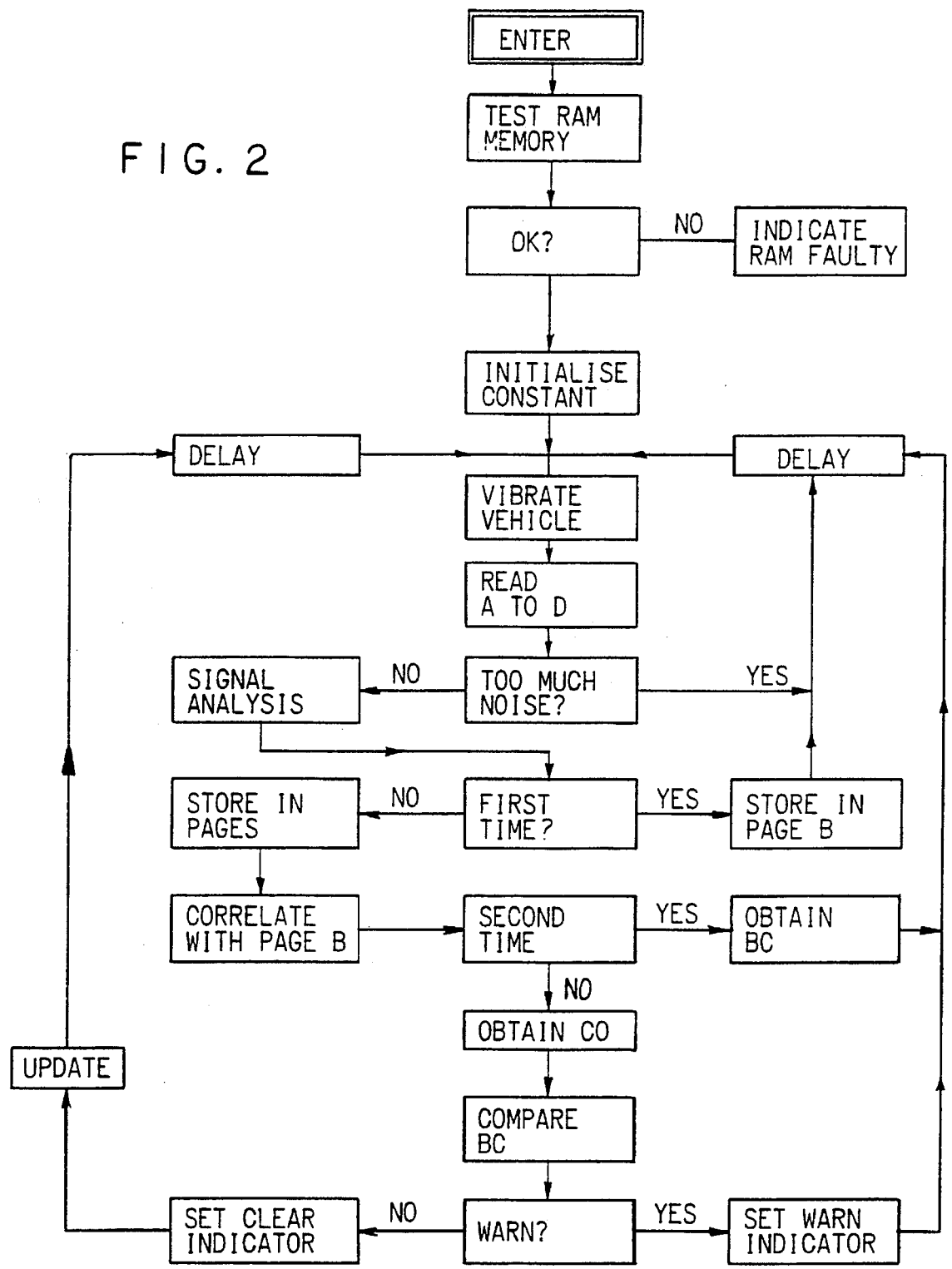

The operation of the equipment, which is summarized in the flow chart of FIG. 2, will now be described in detail. When the vehicle's ignition is switched off, power is supplied to the equipment. A timing circuit controls the power-up sequence. The equipment's random access memory RAM 15 is tested and a suitable delay period follows to allow the driver and passengers to alight. Upon the termination of this delay the program variables are initialised. A microprocessor 14 now energises the excitation system 27. This causes the floor pan etc. of the vehicle to vibrate. The frequency content and amplitude of these vibrations will be characteristic of the vehicle's condition at the time of the occupants' exit. They are detected by the receiving piezo-electric crystals 9 and the resultant signals sent to the analogue to digital converter 13 and hence to the microprocessor for analysis. The signals are first examined to determine if the environmental noise level is too high for a satisfactory analysis to be made. If this should prove to be the case, the system is instructed to wait until the noise level decreases suitably.

A signal analysis is now performed, the result is stored in RAM in an array called say B, one array for each piezo-electric detector 9. The content of each of these arrays is then indicative of the vehicle's condition immediately upon its vacation. As soon as this analysis has been completed the excitors are once again energised in an identical manner as previously. This sequence can be repeated several times if desired and the average values are entered in the array.

The excitors are energised again, the signals received are subjected to the same signal analysis but this time the results are sent to a different array S. A figure of merit is obtained to express the dissimilarity between the contents of the pairs of arrays obtained, namely arrays B and S. In effect it describes how closely consecutive excitations of the vehicle's structure resemble one another. This figure is termed BC in the accompanying flowchart. Ideally BC should of course be zero.

As soon as this analysis is complete and the value of BC obtained, the contents of array S are zeroed. The delay subroutine is entered once again but this time to give a pre-determined delay of approximately one minute. The excitation procedure is initiated again, the signal analysis performed as before but this time a new figure of merit CO, which describes the similarity of the contents of B and the new S, is obtained.

CO is now compared with BC and the result of this comparison is stored as a correlation figure. The magnitude of this correlation number is a measure of how similar the contents of new array S are to those of array B. Those in array B describe the vibrational pattern of the vehicle immediately upon its vacation. BC tells how closely a typical set of values in array S might resemble those in B when the vehicle has been undisturbed whilst CO tells how closely the most recently acquired set in S resembles that in B. If for three consecutive trials, the result of the comparison between BC and CO is greater than a certain figure stored as an initialised variable called say DEC1, then an alarm is given. The figure of merit stored in DEC1 can be termed the decision figure.

Alternatively sequential signal testing can be employed to test when sufficient data has been recorded for a decision to be made. This is particularly useful if a pseudo-random noise generator is used to excite vibrations in the panel.

Referring now to FIG. 1, this shows an example of a circuit which may be used for carrying out the operations described. A relay 17 is coupled to the vehicle ignition system I so that the vehicle's 12 volt supply is connected to a voltage regulator 18 when the ignition is switched off. The voltage regulator 18 provides a 5 volt supply to power the microprocessor 14 and associated circuits which are interconnected by way of an address bus 19 and data bus 20. The EPROM 16 holds the programs for carrying out the operations shown in the flow chart, while the RAM 15 acts as a store for the Pages B and S.

A decoder 21 decodes the addresses. An exciter circuit 22 delivers the required excitation voltage to the piezo-electric crystals 27 to vibrate the vehicle. This is controlled by an output latch 23 and output buffer 24 which also control an indicator or alarm 25 in accordance with the decisions resulting from each test cycle as shown at the bottom of the flow chart of FIG. 2.

Because the vibrational pattern of the car may change slowly, for example as it dries or mechanical strains are relieved by environmental temperature alterations, the content of array B is updated. This updating is only carried out when the ratio of CO to BC exceeds a threshold level representing a close match between the values in array S and those in array B and only when the ratio of CO to BC is less than a predetermined level. The updating can be effected by replacing a percentage of each value in array B with a corresponding percentage of the value in array S.

An interrupt program is executed if a car door sensor 28 indicates a car door is opened. This program retains the setting of the warning indicator but indicates by an interrupt flag that some person has entered or attempted to enter the vehicle during the owner's absence, perhaps to place a device. It only becomes effective after the interrupt flag has been cleared to allow the driver and passengers to alight from the vehicle.

If a device is attached to the vehicle body without direct contact it is still possible by analysis of the vibration pattern to detect changes in loading or damping. Alternatively the vehicle panel can be equipped with elements which are pressed against the panel when a device is attached.

What is claimed is:

1. A detector assembly for sensing the placement of a foreign body on an object:

an exciter unit attached to the object for vibrating the object;

an exciter driver attached to said exciter unit for energizing said exciter unit to cause vibrations of the object;

an exciter controller attached to said exciter driver for selectively actuating said exciter driver so as to cause repetitive energizations of said exciter unit;

a detector attached to the object for monitoring the vibrations of the object in response to the repetitive energizations of said excitor unit, said detector configured to produce vibration signals representative of the vibrations of the object;

a detector signal analyzer coupled to said detector for receiving said vibration signals, said detector signal analyzer circuit being configured to: establish normal vibration data for the object based on initial vibration signals received in response to an initial set of object vibrations; compare later-received vibration signals received in response to later object vibrations that occur after the initial set of object vibrations to said normal vibration data; and, if said comparison indicates that said later-received vibration signals vary beyond a first select limit from said normal vibration data, to generate an alarm signal; and an alarm connected to receive said alarm signal, said alarm being configured to generate a warning message when said alarm signal is generated.

2. The detector assembly of claim 1, wherein said detector signal analyzer is configured so that when said later-received vibration signals do not vary from the normal vibration beyond the first select limit from said normal vibration data, said detector signal analyzer revises said normal vibration data based on said later-received vibration signals.

3. The detector assembly of claim 2, wherein said detector signal analyzer is configured to revise said normal vibration data with said later-received vibration signals only when said later-received vibration signals vary from the normal vibration data by a second select limit less than the first select limit.

4. The detector assembly of claim 1, wherein said detector signal analyzer is configured to: establish said normal vibration data by establishing a normal signal pattern based on at least one initial vibration signal and by determining a normal deviation between a first later-received vibration signal and said normal signal pattern; to compare subsequent later-received vibration signals received after said first later-received vibration signal to the normal vibration data by determining a deviation between said subsequent later-received vibration signals and said normal signal pattern and by comparing said deviation between said normal signal pattern and said subsequent later-received vibration signals to said normal deviation; and, if said later-received vibration signal deviation between said normal signal pattern and said subsequent later-received vibration signals vary from said normal deviation by a select deviation limit, to generate said alarm signal.

5. The detector assembly of claim 4, wherein said detector signal analyzer is configured so that when said later-received vibration signal deviation between said normal signal pattern and said subsequent later-received vibration signals is within the select deviation limit relative to said normal deviation, to recompute the normal deviation based on said subsequent later-received vibration signals.

6. The detector assembly of claim 1, wherein said detector signal analyzer is configured to establish the normal vibration data based on initial vibration signals that are based on a plurality of initial vibrations of the object.

7. The detector assembly of claim 1, wherein said exciter unit is a piezo-electric device.

8. The detector assembly of claim 1, wherein said detector is a piezo-electric device.

9. A detector assembly for determining whether a foreign object has been placed on a vehicle, the vehicle including an ignition system for controlling the actuation of the vehicle and doors through which occupants enter and egress the vehicle, said detector assembly including:

an occupancy sensor mounted to the vehicle for determining whether the vehicle is occupied, said occupancy sensor being configured to generate a vehicle-vacant signal when the vehicle is unoccupied;

at least one exciter unit mounted to the vehicle for selectively vibrating a portion of the vehicle to which said exciter unit is attached so as to cause exciter unit-induced vibrations of the vehicle;

at least one motion detector mounted to the vehicle at a location where the exciter unit-induced vibrations of the vehicle can be detected, said at least one motion detector being configured to generate motion detector signals representative of the exciter unit-induced vibrations of the vehicle;

an exciter unit controller connected to said occupancy sensor and to said exciter unit, said exciter unit controller being configured to repetitively actuate said at least one exciter unit when said occupancy sensor generates said vehicle-vacant signal;

a detector signal processor connected to said at least one motion detector for receiving said motion detector signals, said detector signal processor being configured to establish normal vibration data based on initial motion detector signals received in response to at least one initial exciter unit-induced vibration of the vehicle, to compare later-received motion detector signals received after said at least one initial exciter unit-induced vibration of the vehicle in response to later exciter-unit induced vibrations of the vehicle that occur after the at least one initial exciter unit-induced vibration of the vehicle to said normal vibration data and, if said later-received motion detector signals deviate from said normal vibration data by a first selected limit, to generate an alarm signal; and an indicator connected to said detector signal processor for receiving said alarm signal, said indicator being configured to produce a warning message when said alarm signal is generated.

10. The vehicle foreign object detector of claim 9, wherein said occupancy sensor is connected to the vehicle ignition system for monitoring an on/off state of the vehicle ignition system and is configured to assert said vehicle-vacant signal when the ignition system is in the off state.

11. The vehicle foreign object detector of claim 10, wherein said occupancy sensor is configured to apply an energization voltage to said exciter unit controller and said detector signal processor when the vehicle ignition system is in the off state so that said energization voltage functions as said vehicle-vacant signal.

12. The vehicle foreign object detector of claim 9, further including a door state sensor mounted to the doors of the vehicle for evaluating an open/closed state of the vehicle doors, said door sensor being configured to generate a door-open signal when a door of the vehicle is in an open state and said detector signal processor is connected to said door sensor for receiving said door-open signal and is configured to inhibit generation of said alarm signal when said door-open signal is received.

13. The vehicle foreign object detector of claim 9, wherein said detector signal processor is configured so that when said later-received motion detector signals received in response to the later exciter unit-induced vibrations of the vehicle do not deviate from the normal vibration data beyond the first selected limit, maid detector signal processor revises said normal vibration data based on said later-received motion detector signals.

14. The vehicle foreign object detector of claim 13, wherein said detector signal processor is configured to revise said normal vibration data with the later-received motion detector signals received in response to the later exciter unit-induced vibrations of the vehicle only when said later-received motion detector signals deviate from the normal vibration data by a second selected limit less than the first selected limit.

15. The vehicle foreign object detector of claim 9, wherein said detector signal processor is configured to establish said normal vibration data based on initial motion detector signals that are based on a plurality of initial vibrations of the vehicle by said exciter unit.

16. The vehicle foreign object detector of claim 9, wherein said detector signal processor is configured to; produce said normal vibration data by determining a normal deviation between at least two successive initial motion detector signals; compare said later-received motion detector signals received in response to the later exciter unit-induced vibrations of the vehicle to at least one of said initial motion detector signals to compute a current deviation between said later-received motion signals and said initial motion signals; compare said current deviation to said normal deviation; and, if said current deviation varies from said normal deviation beyond an acceptable limit, to generate said alarm signal.

* * * * *

UNITED STATES PATENT AND TRADEMARK OFFICE
CERTIFICATE OF CORRECTION

PATENT NO. : 5,591,916
DATED : January 7, 1997
INVENTOR(S) : Frederick N. Byrne

It is certified that error appears in the above-indentified patent and that said Letters Patent is hereby corrected as shown below:

Column 4, line 30; after "vibration" (second occurrence) insert ---data---.

Column 6, line 40; change "to;" to ---to:---.

Signed and Sealed this

Tenth Day of June, 1997

BRUCE LEHMAN

Attest:

Attesting Officer

Commissioner of Patents and Trademarks